Nov. 11, 1924.  1,514,651

F. BURGESS

GEAR CUTTING MACHINE

Filed Feb. 17, 1917   3 Sheets—Sheet 1

Inventor:
Frank Burgess
by Clyde L. Rogers
his atty.

Nov. 11, 1924.

F. BURGESS

GEAR CUTTING MACHINE

Filed Feb. 17, 1917

Inventor:
Frank Burgess
by Clyde L. Rogers
his Atty.

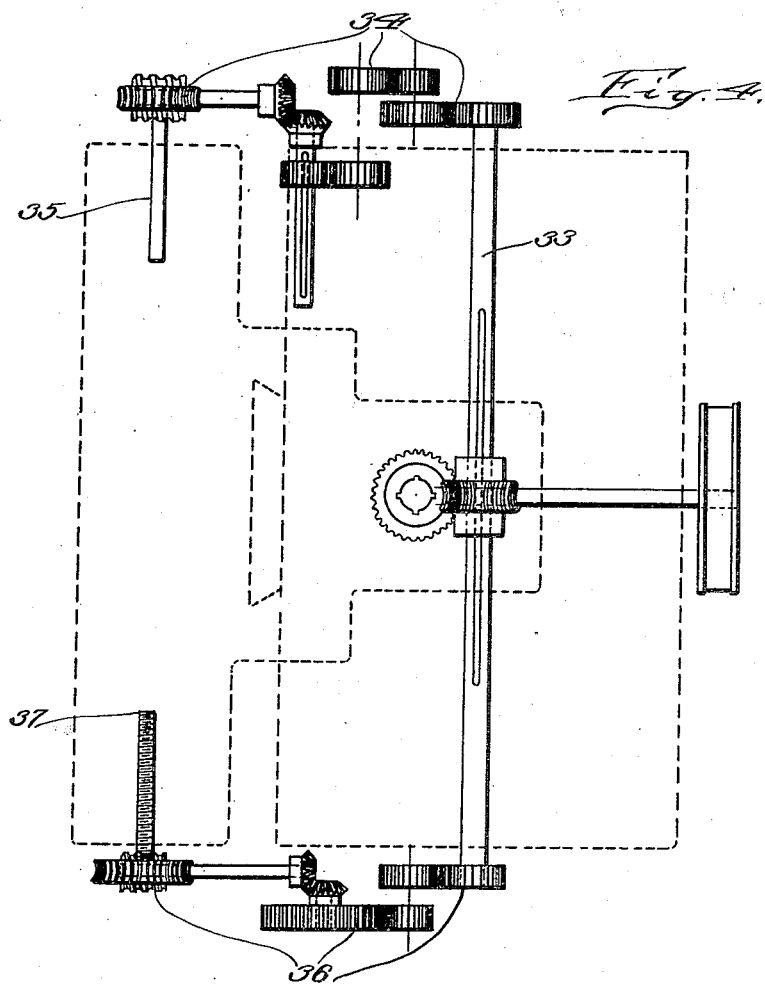

Patented Nov. 11, 1924.

1,514,651

UNITED STATES PATENT OFFICE.

FRANK BURGESS, OF QUINCY, MASSACHUSETTS.

GEAR-CUTTING MACHINE.

Application filed February 17, 1921. Serial No. 445,731.

*To all whom it may concern:*

Be it known that I, FRANK BURGESS, a citizen of the United States, and resident of Quincy, county of Norfolk, Commonwealth of Massachusetts, have invented an Improvement in Gear-Cutting Machines, of which the following description, in connection with the accompanying drawings, is a specification, like characters on the drawings representing like parts in each of the several views.

This invention relates more particularly to gear hobbing machines, though in a broader aspect being also applicable to milling machines generally. A principal object of the invention is to provide a mounting for the shaft bearing the hob or other cutter, whereby the cutter as it extends forwardly from the head over the work platen may be strongly and rigidly supported approximately central of the platen, either projecting straight out from the head, or at any required angle according to whether the work in hand be the hobbing of spur gears or helical gears of any desired angle. A further object is to provide a simplified and particularly efficient distribution of power, for the work rotating and feed movements and for the driving of the hob. The foregoing and other objects and advantages of the invention will more fully appear from the following detailed description, and the distinctive features of novelty will be pointed out in the appended claims.

Referring to the drawings:

Fig. 4 is a diagrammatic plan view illustrating the distribution of power from the prime drive shaft.

Figure 1:
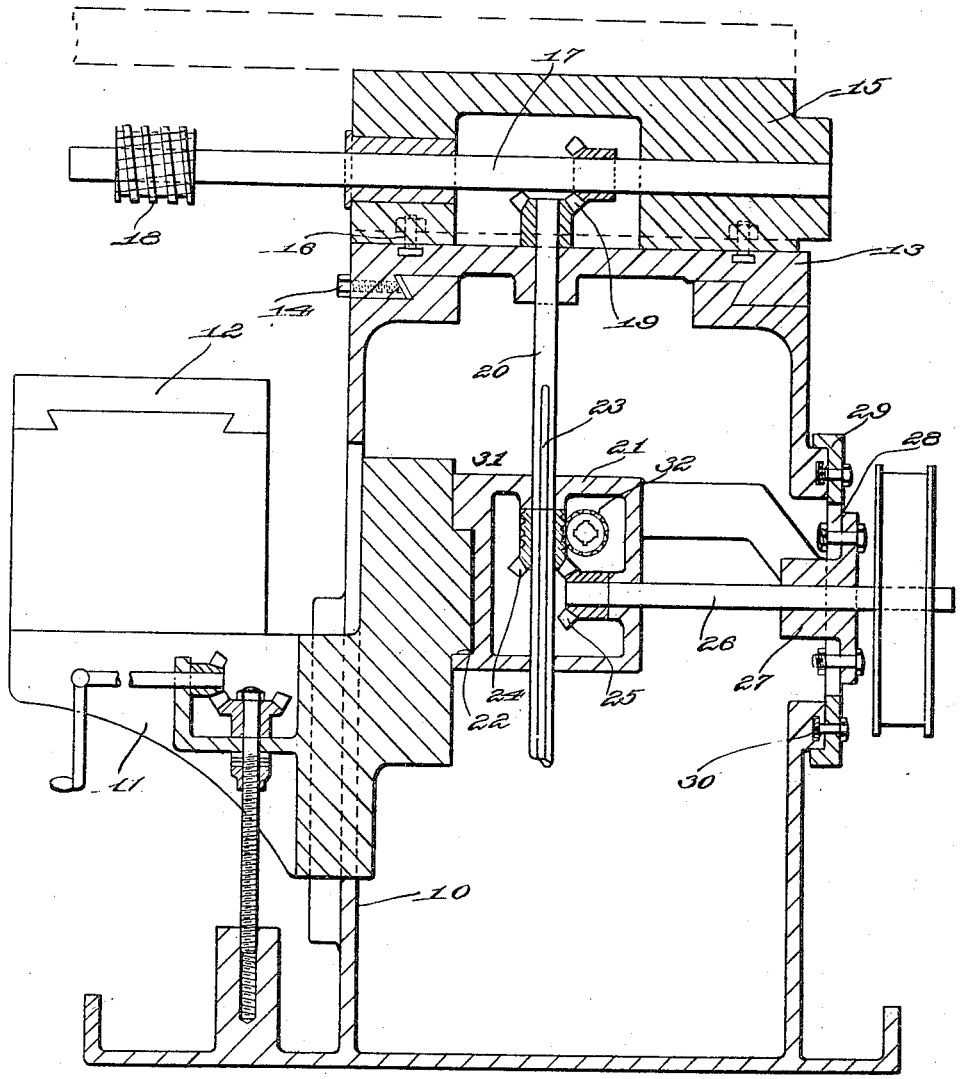
Fig. 1 is a central vertical section of a gear hobbing machine embodying the invention.
Figure 2:
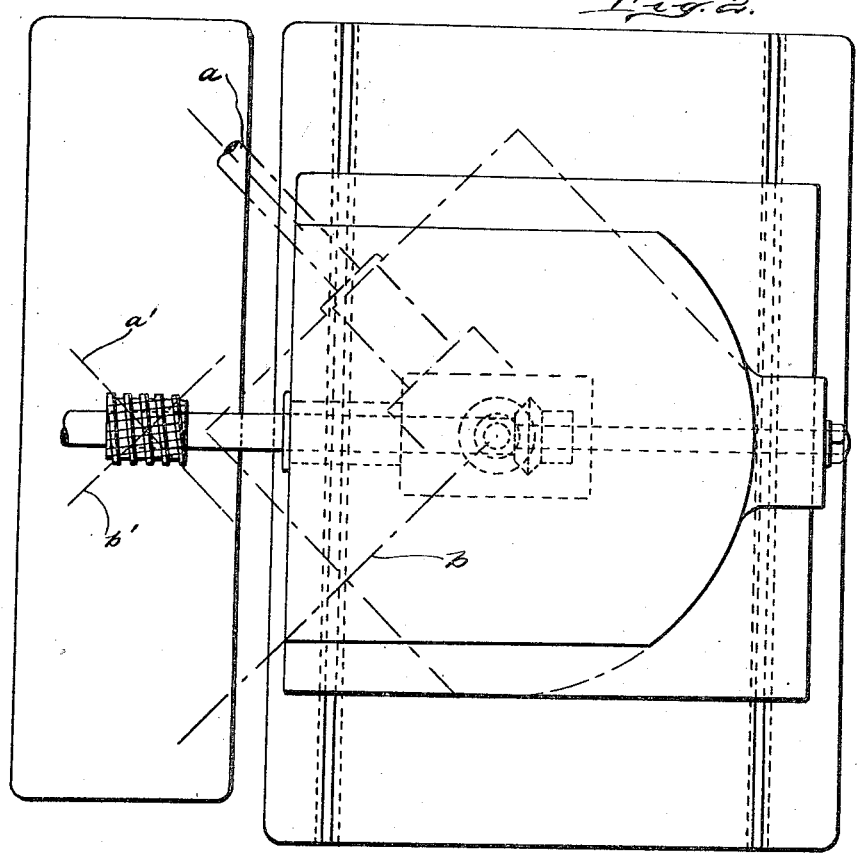
Fig. 2 is a plan view thereof.
Figure 3:
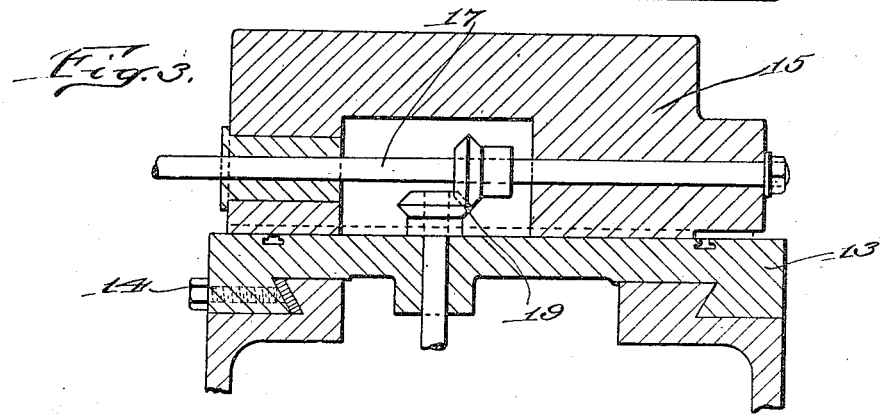
Fig. 3 is a partial vertical section of the mounting head for the hob shaft.

10 indicates the frame work and housing of the machine equipped at its front with ways on which is guided for vertical movement a knee 11, bearing a work-holding platen 12. At the top of the housing column 10, a head plate 13 is mounted for sliding adjustment in parallelism with the platen 12, and is adapted to be rigidly clamped in adjusted position thereon by suitable clamping devices 14. On this head plate a swivel head 15 is mounted for angular adjustment and is adapted to be clamped rigidly thereto in adjusted position by T-headed clamping bolts 16, engaging in a circular undercut slot of the head plate 13. The swivel head 15 has journalled therein a shaft 17, projecting forwardly therefrom and bearing a hob 18 extending over the platen 12. The shaft 17 is driven by bevel gears 19 from a vertical shaft 20, the upper end of which is journalled in the plate 13, and the lower end of which is journalled in a block 21 mounted for sliding adjustment on ways 22 formed on an inward extension of the knee 11. The shaft 20 has one or more key ways 23 formed therein, and is slidably keyed to a bevel gear 24 housed in the block 21 which meshes with another bevel gear 25, fixed on a prime drive shaft 26. The shaft 26 has its outer portion journalled in a bushing block 27, which is clamped for vertical adjustment as indicated at 28 in a plate 29 which in turn is clamped for horizontal adjustment on the housing, as indicated at 30. The gear 24 has a hub portion equipped with a worm 31, which drives a worm gear 32 slidably keyed on a shaft 33 horizontally journalled in the housing. This shaft 33 serves to distribute power for rotating the work and for feeding the same. For this purpose a train of gears 34 leads from one end of this shaft to a shaft 35 extending lengthwise of the platen and connected to rotate the work by suitable means well understood in the art, and not shown herein, while the other end of the shaft is connected by a gear train 36 to a feed screw 37 which operates the platen in suitable manner as well known in the art. When the machine is to be used for cutting spur gears, the hob shaft extends directly outward from the head aproximately central of the length of the platen as shown in full lines in Figure 2. When it is desired to cut spiral gears of any large angle, the hob shaft is set at the required angle either to the right or to the left as indicated at $a, b$ in Figure 2, and the head 13 is then adjusted endwise, so as to bring the hob again approximately over the center of the platen as indicated at $a'$ $b'$. I am thus enabled to locate the hob or other rotary cutting element directly over the center of the platen in any desired position of angular adjustment either to the right or to the left whereby the hob and the workpiece are held and supported most strongly and rigidly with respect to each other, thus minimizing chattering and possibilities of inaccuracy owing to looseness of any member, insuring maximum smoothness and efficiency in cutting the teeth. By the described construction I also provide for the distribution of power for rotating the hob and the workpiece, and the feed movement, with a minimum number of gears and shaft centers, thus minimizing the possibility of inaccuracy owing to backlash and like causes. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. A gear cutting machine comprising a work holding platen presenting a horizontally extending work-holding face, a horizontally extending shaft bearing a hob at its outer end extending substantially over said platen, and a mounting for said shaft permitting angular adjustment thereof in a horizontal plane and also bodily adjustment laterally for permitting location of the hob substantially central of the platen irrespective of the angular adjustment thereof.

2. A gear cutting machine comprising a platen support for a work piece, a shaft bearing a hob at its outer end portion extending substantially over the work-holding face of said platen, and a mounting for said shaft permitting angular adjustment thereof, in a plane parallel of said work-holding face and also rectilinear adjustment in parallelism with the platen in a direction whereby the hob may be located centrally with respect to the platen irrespective of angular adjustment thereof.

3. A gear cutting machine comprising a vertical shaft, a hob-bearing shaft in direct geared connection therewith and mounted for angular adjustment around said vertical shaft as an axis with the hob borne thereby relatively remote from such axis, and a horizontally extending shaft in geared engagement with said vertical shaft having connections from one end thereof for rotating the workpiece, and connections from the other end thereof for feeding the same.

In testimony whereof, I have signed my name to this specification.

FRANK BURGESS.